(12) United States Patent
Hu

(10) Patent No.: US 8,824,432 B2
(45) Date of Patent: Sep. 2, 2014

(54) BEACONING PERIOD FRAMING FOR EFFICIENT MULTI-CHANNEL INTER-CELL COMMUNICATIONS IN COGNITIVE RADIO NETWORKS

(75) Inventor: Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 528 days.

(21) Appl. No.: 12/354,593

(22) Filed: Jan. 15, 2009

(65) Prior Publication Data
US 2009/0180453 A1 Jul. 16, 2009

Related U.S. Application Data

(60) Provisional application No. 61/021,571, filed on Jan. 16, 2008.

(51) Int. Cl.
*H04W 4/00* (2009.01)

(52) U.S. Cl.
USPC ......................................... 370/338

(58) Field of Classification Search
USPC ......... 370/203, 204–215, 229–240, 241–253, 370/310–337, 395.3, 395.4, 395.41, 395.42, 370/395.5, 395.52, 431–457, 458–463, 370/464–497, 498–529
See application file for complete search history.

(56) References Cited

U.S. PATENT DOCUMENTS

| | | | |
|---|---|---|---|
| 5,191,578 A | 3/1993 | Lee | |
| 5,394,433 A | 2/1995 | Bantz et al. | |
| 5,574,979 A | 11/1996 | West | |
| 5,627,880 A | 5/1997 | Rozanski et al. | |
| 5,862,142 A | 1/1999 | Takiyasu et al. | |
| 6,788,702 B1 | 9/2004 | Garcia-Luna-Aceves et al. | |
| 6,882,851 B2 * | 4/2005 | Sugar et al. | 455/454 |
| 6,961,426 B2 | 11/2005 | Vesely | |
| 7,146,172 B2 | 12/2006 | Li et al. | |
| 7,197,025 B2 | 3/2007 | Chuah | |

(Continued)

FOREIGN PATENT DOCUMENTS

| | | |
|---|---|---|
| EP | 1850543 A2 | 10/2007 |
| GB | 2165726 A | 4/1986 |

OTHER PUBLICATIONS

Hu, Wendong et al., Efficient, Flexible, and Scalable Inter-Network Spectrum Sharing and Communications in Cognitive IEEE 802.22 Networks, STMicroelectronics Inc. and University of California, Los Angeles, No Date, pp. 5.

(Continued)

*Primary Examiner* — Jung-Jen Liu
(74) *Attorney, Agent, or Firm* — Hogan Lovells US LLP

(57) ABSTRACT

A protocol for inter-cell communication in a cognitive radio wireless access network using beacon period framing is disclosed. By establishing scheduled use of beacon periods within each frame of a super-frame among a plurality of participating cells in a wireless access network, efficient and reliable communication can take place eliminating beacon packet collisions and bandwidth wastage. Within each super-frame exits 16 data frames of fixed size which can each include both a data transmission portion and a beacon period. A protocol is established by which announcement, reserved, and free-to-use beacon periods are established within the super-frames associated with a particular spectrum. By coordinating communication between cells on the beacon period, collision between cells by simultaneous attempts to transmit or bandwidth wastage of periods in which no transmission takes place can be avoided.

19 Claims, 6 Drawing Sheets

(56) References Cited

U.S. PATENT DOCUMENTS

| | | | |
|---|---|---|---|
| 7,289,542 B2 | 10/2007 | Schmandt | |
| 7,423,966 B2 * | 9/2008 | Xu | 370/230 |
| 7,496,081 B2 * | 2/2009 | Salokannel et al. | 370/348 |
| 7,505,761 B2 * | 3/2009 | Ikeda | 455/418 |
| 7,715,343 B2 | 5/2010 | Tomioka | |
| 7,742,764 B2 * | 6/2010 | Gillig et al. | 455/434 |
| 7,756,058 B2 * | 7/2010 | Cordeiro et al. | 370/252 |
| 7,801,077 B2 * | 9/2010 | Rentel et al. | 370/329 |
| 7,801,104 B2 | 9/2010 | Gaur | |
| 7,801,526 B2 * | 9/2010 | Newberg et al. | 455/435.1 |
| 7,826,422 B2 * | 11/2010 | Chu et al. | 370/329 |
| 7,860,500 B2 * | 12/2010 | Buchwald et al. | 455/434 |
| 7,937,045 B2 * | 5/2011 | Lekselius | 455/75 |
| 8,036,241 B2 | 10/2011 | Ji et al. | |
| 2002/0176364 A1 | 11/2002 | Nakamura et al. | |
| 2003/0156553 A1 | 8/2003 | Benveniste | |
| 2003/0224787 A1 | 12/2003 | Gandolfo | |
| 2004/0028003 A1 | 2/2004 | Diener et al. | |
| 2004/0090979 A1 * | 5/2004 | Xu | 370/444 |
| 2004/0166838 A1 | 8/2004 | Backes et al. | |
| 2006/0225089 A1 * | 10/2006 | Ikeda | 725/25 |
| 2006/0239220 A1 * | 10/2006 | Celentano et al. | 370/328 |
| 2006/0245448 A1 | 11/2006 | Chan et al. | |
| 2007/0091998 A1 | 4/2007 | Woo et al. | |
| 2007/0165586 A1 * | 7/2007 | Taylor et al. | 370/338 |
| 2007/0258404 A1 | 11/2007 | Tirkkonen et al. | |
| 2007/0274206 A1 * | 11/2007 | Habetha et al. | 370/222 |
| 2008/0009305 A1 * | 1/2008 | Li et al. | 455/522 |
| 2008/0014861 A1 * | 1/2008 | Li et al. | 455/3.01 |
| 2008/0101264 A1 * | 5/2008 | Li et al. | 370/310 |
| 2008/0101447 A1 * | 5/2008 | Li et al. | 375/222 |
| 2008/0144493 A1 | 6/2008 | Yeh | |
| 2008/0159258 A1 * | 7/2008 | Ji et al. | 370/350 |
| 2008/0267148 A1 | 10/2008 | Speight | |
| 2008/0309490 A1 | 12/2008 | Honkanen et al. | |
| 2008/0317062 A1 * | 12/2008 | Timmers et al. | 370/462 |
| 2009/0067354 A1 | 3/2009 | Gao et al. | |
| 2009/0096660 A1 * | 4/2009 | Lekselius | 342/21 |
| 2009/0180453 A1 * | 7/2009 | Hu | 370/338 |
| 2009/0180492 A1 * | 7/2009 | Hu | 370/462 |
| 2009/0258603 A1 * | 10/2009 | Ghaboosi et al. | 455/68 |
| 2009/0274140 A1 * | 11/2009 | Cordeiro et al. | 370/350 |
| 2009/0274195 A1 * | 11/2009 | Chang | 375/145 |
| 2009/0323697 A1 * | 12/2009 | Celentano et al. | 370/395.42 |
| 2010/0009692 A1 * | 1/2010 | Shan et al. | 455/450 |
| 2010/0020732 A1 * | 1/2010 | Gaddam et al. | 370/310 |
| 2010/0034143 A1 * | 2/2010 | Cordeiro et al. | 370/328 |
| 2010/0091711 A1 * | 4/2010 | Sawai | 370/328 |
| 2010/0232310 A1 * | 9/2010 | Hu | 370/252 |
| 2010/0232358 A1 * | 9/2010 | Hu | 370/328 |
| 2010/0232359 A1 * | 9/2010 | Hu | 370/328 |
| 2010/0232360 A1 * | 9/2010 | Hu | 370/328 |
| 2010/0232361 A1 * | 9/2010 | Hu | 370/328 |
| 2010/0232381 A1 * | 9/2010 | Hu | 370/329 |
| 2010/0246434 A1 * | 9/2010 | Wang et al. | 370/253 |
| 2010/0260085 A1 * | 10/2010 | Wang et al. | 370/311 |
| 2010/0271948 A1 * | 10/2010 | Challapali et al. | 370/235 |
| 2010/0296404 A1 * | 11/2010 | Quadri et al. | 370/252 |
| 2010/0304772 A1 * | 12/2010 | Wang et al. | 455/509 |
| 2011/0032912 A1 * | 2/2011 | Cordeiro et al. | 370/336 |
| 2011/0090887 A1 * | 4/2011 | Kim et al. | 370/338 |

OTHER PUBLICATIONS

Hu, Wendong, Beaconing Period Framing for Efficient Multi-Channel Inter-Cell Communications in Cognitive Radio Networks, Jan. 7, 2008, pp. 9.

IEEE P802.22 Wireless RANs (Nov. 2005) authored by Hu, Wendong and Sofer, Eli.

* cited by examiner

BEACONING PERIOD FRAMING FOR EFFICIENT MULTI-CHANNEL INTER-CELL COMMUNICATIONS IN COGNITIVE RADIO NETWORKS

RELATED APPLICATION

The present application relates to and claims the benefit of priority to U.S. Provisional Patent Application No. 61/021,571 filed Jan. 16, 2008, which is hereby incorporated by reference in its entirety for all purposes as if fully set forth herein. The present application further relates to U.S. patent application Ser. No. 12/354,606 filed Jan. 15, 2009 and entitled, "On-demand Spectrum Contention for Inter-cell Spectrum Sharing in Cognitive Radio Networks" and U.S. patent application Ser. No. 11/549,890 filed Oct. 16, 2006 entitled, "Method of Inter-System Co-Existence and Spectrum Sharing for Dynamic Spectrum Access Networks-On-Demand Spectrum Contention," which are both hereby incorporated by reference in their entirety for all purposes as if fully set forth herein.

BACKGROUND OF THE INVENTION

1. Field of the Invention

Embodiments of the present invention relate, in general, to inter-cell spectrum sharing in cognitive radio networks and particularly to beacon period framing for inter-cell communication of on-demand spectrum contention resolution.

2. Relevant Background

Cognitive Radio is an enabling technology that allows unlicensed radio transmitters to operate in licensed bands at locations when that spectrum is temporarily not in use. Based on cognitive radio technology, Institute of Electrical and Electronics Engineers ("IEEE") 802.22, following a Federal Communication Commission ("FCC") Notice of Proposed Rulemaking in 2004, is an emerging standard for Wireless Regional Area Networks ("WRAN") aiming to provide alternative broadband wireless access in, among other places, rural areas. Cognitive radio operates on a license-exempt and non-interference basis in the Television ("TV") band (between 47-910 MHz) without creating harmful interference to the licensed services, which include, among others, Digital TV ("DTV") and Part 74 devices (e.g. wireless microphones).

One of the key design challenges in cognitive radio network systems, such as the one specified in 802.22, is how to establish reliable and efficient communication links between the coexisting network cells. This is important to ensure proper operations of the coexisting cells in many aspects (such as quiet period synchronization, network discovery, and negotiation for channel use) in order to achieve the goals of coordinated incumbent protection and dynamic spectrum sharing.

In a typical deployment scenario, multiple WRAN cells, each of which comprises a base station ("BS") and associated customer premise equipments ("CPE"), may operate in the same vicinity while coexisting with DTV and Part 74 devices. In order to effectively avoid harmful interference to these licensed incumbents, the set of channels on which the WRAN cells are allowed to operate could be quite limited. For example as shown in FIG. 1, residing within the protection contours of DTV 140 and wireless microphones 150, both WRAN1 110 and WRAN3 130 are only allowed to operate on channel A, while WRAN2 120 may occupy either channel A or B, assuming that in total only 3 channels (channel A, B and C) are available. If WRAN1 and WRAN3 (or WRAN1 and WRAN2) attempt to perform data transmissions on channel A simultaneously, mutual interference between these collocated WRAN cells could degrade the system performance significantly.

As well known to one skilled in the prior art, IEEE 802.22 provides a basic inter-cell communication mechanism called coexistence beaconing protocol ("CBP"), which allows the coexisting network cells to exchange coexistence beacons using the synchronized beacon periods ("BP") scheduled at the end of the Medium Access Control ("MAC") layer frames. To access the BPs by multiple coexisting network cells, well-know contention-based schemes such as Carrier Sense Multiple Access ("CSMA") can be employed.

FIG. 2 shows a general depiction of a super-frame data structure as known to one skilled in the relevant art. The present depiction is of three channels 210, channel A, B, and C. All channels 210 have synchronized super-frames 215, which consist of 16 frames $220_1, 220_2, 220_3, \ldots 220_{16}$ with fixed frame size 240. Each frame can be divided into two parts: Data Transmission Period ("DTP") 250 and an optional fixed sized Beacon Period 260. When an allocated beacon period is not utilized in a frame, the network cell can use the whole frame for data transmission without engaging in any inter-cell communication.

FIG. 3 depicts an example as known to one skilled in the relevant art showing how WRAN1 110 and WRAN2 120, operating on two different channels (Channel A 310 and B 320) can exchange CBP packets across channels. CBP however only allows a single network cell to transmit CBP packets in the BPs on its operating channel; in other words, off-channel BPs can only be used in the receive mode. As shown in Frame n 330 Cell 1 110 is transmitting while Cell 2 120 is receiving. In the same manner in Frame n+1 340 Cell 2's 320 BP is transmitting and Cell 1 310 is receiving. This successful illustration of communication is not always present. For example Frames n+2, n+3, and n all show examples of unsuccessful communication. In Frame n+2 350 both Cell 1 110 and Cell 2 120 are transmitting. Since neither cell is in capture mode the transmission fails. Similarly in Frame n+3 both Cell 1 110 and Cell 2 120 are in receiving mode ready to capture a transmission. However no transmission is present, again resulting in communication failure. Finally in Frame n 370 it is shown that the entire frame can be occupied by data transmission eliminating the possibility of transmission or capture.

FIG. 4 shows an example of CBP communications as known to one skilled in the relevant art where two coexisting network cells, WRAN 1 110 and WRAN 2 120, operating on the same channel (Channel A 410) are transmitting or receiving CBP packets during the synchronized BPs 420. For example in Frame 430 Cell 1 110 is transmitting and Cell 2 120 is receiving. Thus an effective communication link has taken place. Similarly in Frame n+1 440 Cell 2 120 is transmitting and Cell 1 110 is receiving. However in Frame n+2 both Cell 1 110 and Cell 2 120 are transmitting resulting in a communication failure. Likewise in Frame n+3 460, when both cells are in capture mode, no communication takes place. Lastly in Frame n+4, when the entire frame is occupied by data transmission, no communication between cells is possible.

In order to avoid performance degradation of CBP transmission due to multipath fading and shadowing, it is desirable to perform inter-cell communications (either transmitting or receiving) in a distributive fashion in which all stations in a network cell participate. Moreover, from a system design point of view, scheduling all stations in a cell to perform either transmitting or receiving a CBP packet during a BP can significantly reduce the design complexity.

Although the design of CBP has the advantage of simplicity, the CBP packets are transmitted by a network cell in non-deterministic instances that are unknown to other neighboring network cells. This non-coordinated nature of CBP communication causes a degradation of system performance and efficiency for handling intensive single- and multi-channel inter-cell communications.

One of the issues is packet loss due to collision of CBP packet transmissions, shown in Frame n+2 450 of FIG. 4. Since beacons are transmitted through random access during the BPs, when inter-cell communication becomes more intensive (i.e. more cells participate and more beacons are transmitted), there is a higher probability that two or more co-channel coexisting cells will transmit beacons in the same BP and cause collision at a receiving station. CBP packet collisions will lead to packet loss, therefore increasing the communication latency (the communication will not complete until a new CBP packet has been successfully received) and reducing the system efficiency (the bandwidth for transmitting and receiving the CBP packets that are dropped is wasted).

Another issue is bandwidth wastage. As mentioned above, collisions will cause the bandwidth used for transmitting and receiving the beacon to be wasted. On the other hand, a BP may be scheduled by a network cell in order to capture a randomly arrived beacon packet. If no beacon is captured in the scheduled BP, the bandwidth is wasted as well. Similarly, bandwidth wastage will happen when a transmitted CBP packet is not received by a target network cell that is not prepared to receive such a package. This "no capture" effect is shown in FIGS. 3 and 4 in Frame n+3 360, 460 respectively. Note that in IEEE 802.22 as an example, each frame has a fixed duration of 10 ms (24~28 OFDM symbols) and the BP size is 4~5 OFDM symbols. Therefore the overhead for inter-cell communication using CBP is quite large (about 13%~20.8%) when a BP is scheduled in a frame, and enhancing bandwidth efficiency should be a key design goal for developing inter-cell communication protocol.

Cognitive radio network cells typically perform network discovery on a regular basis to identify neighboring cells that are operating co-channel or cross-channel. This process is usually performed by capturing beacon packets broadcasted by the neighboring cells. As shown, using the basic CBP, due to the random characteristic of the CBP packet transmission, a discovering network cell would have to continuously stay on a channel and monitor CBP packets for a potentially large number of frames. Obviously this causes significant overhead in bandwidth usage (and wastage) on one hand, and on the other hand, results in a long delay in discovering neighbors are undesirable for certain inter-cell coordination algorithms (such as load balancing, quiet period synchronization, etc.). Needed, therefore, is a protocol that enables reliable, efficient, and scalable inter-network communication in support of inter-network coordination functions.

BRIEF SUMMARY OF THE INVENTION

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE SEVERAL VIEWS OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
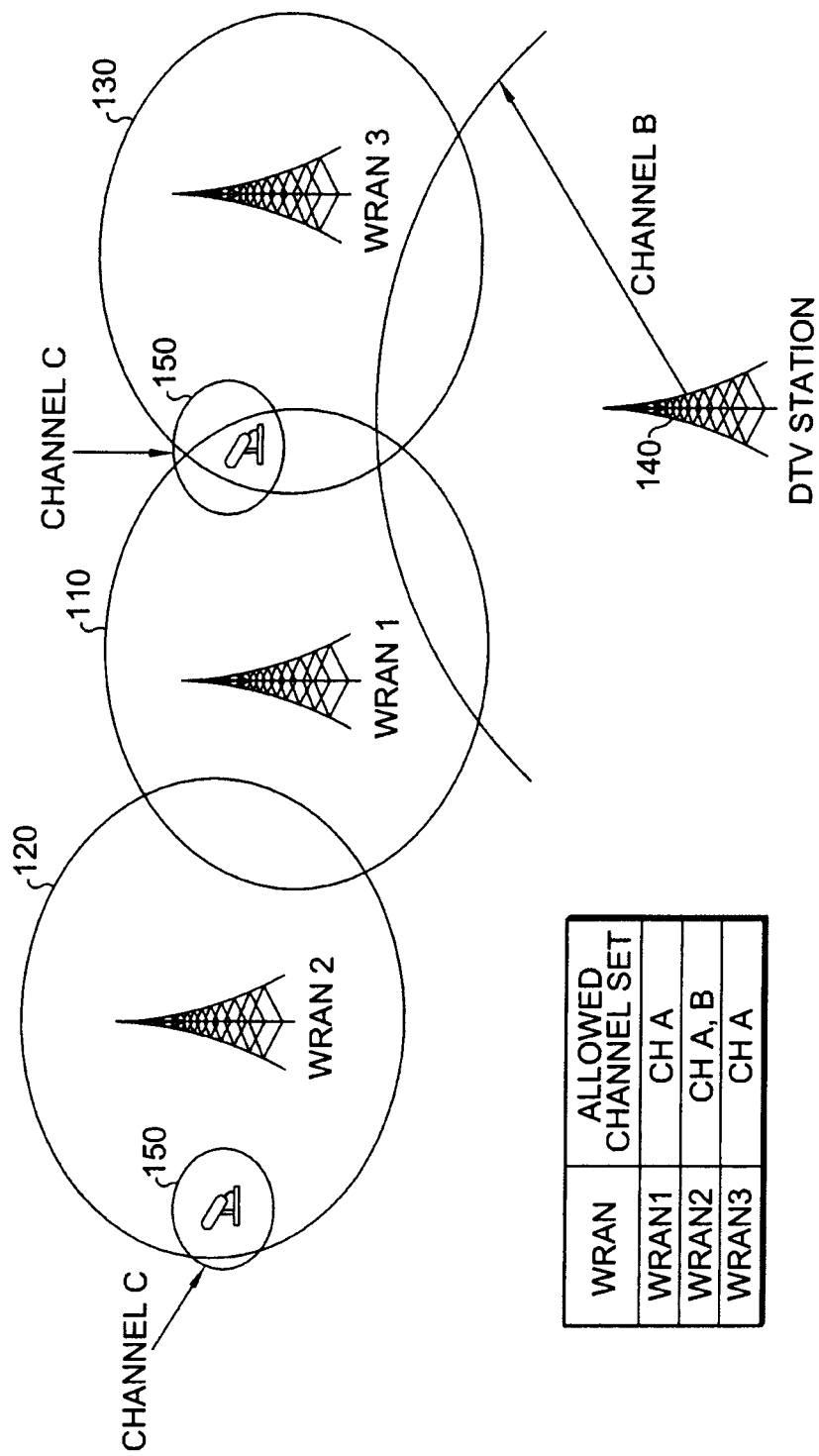
FIG. 1 shows a cognitive radio wireless network of three overlapping cells and an incumbent digital television station as known in the prior art.
Figure 2:
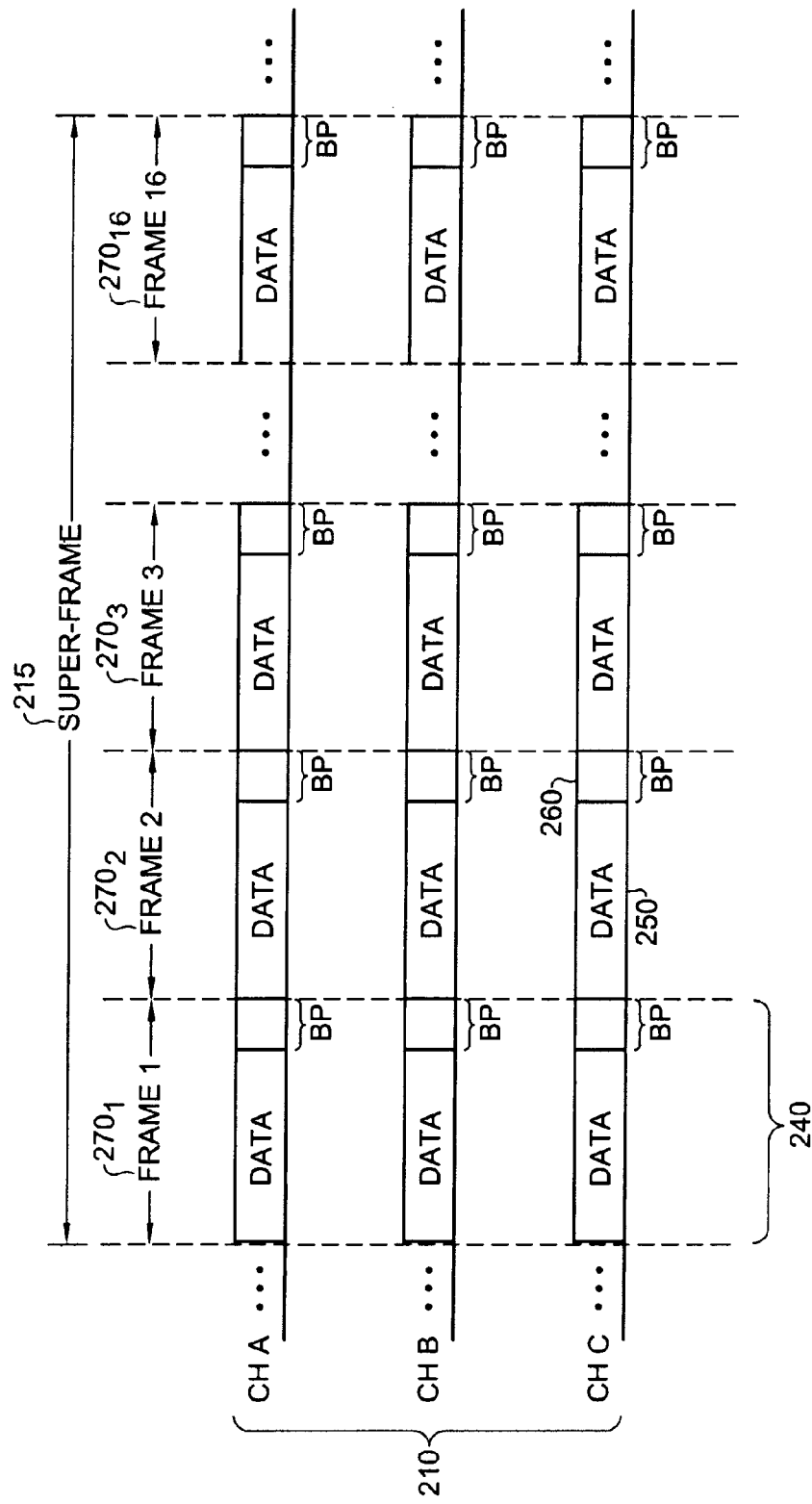
FIG. 2 depicts a synchronized super-frame structure utilized in inter-cell and data communication as known in the art of cognitive radio networks.
Figure 3:
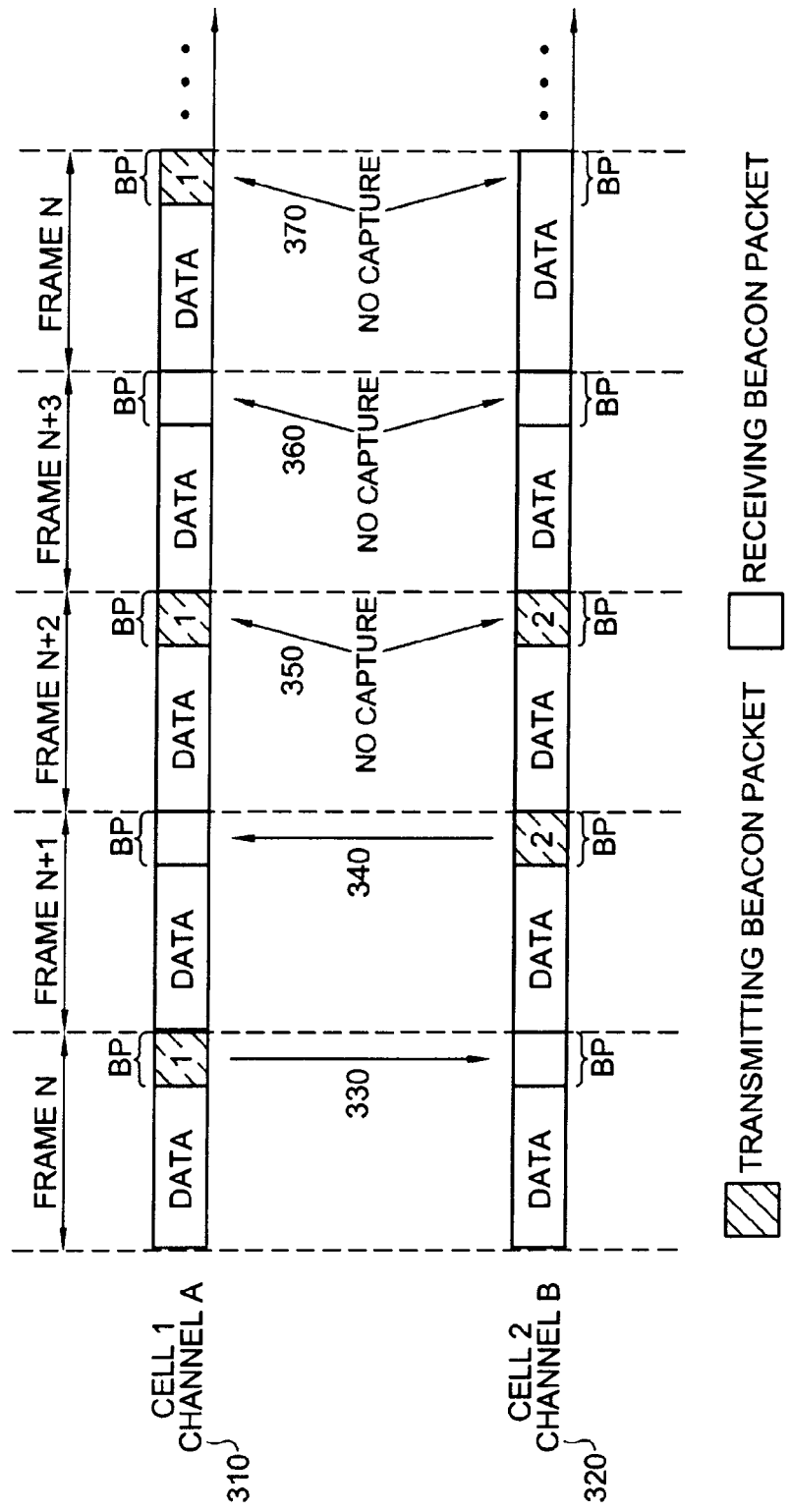
FIG. 3 shows an example of CBP inter-cell communication as known in the prior art in which two cells are operating on different channels.
Figure 4:
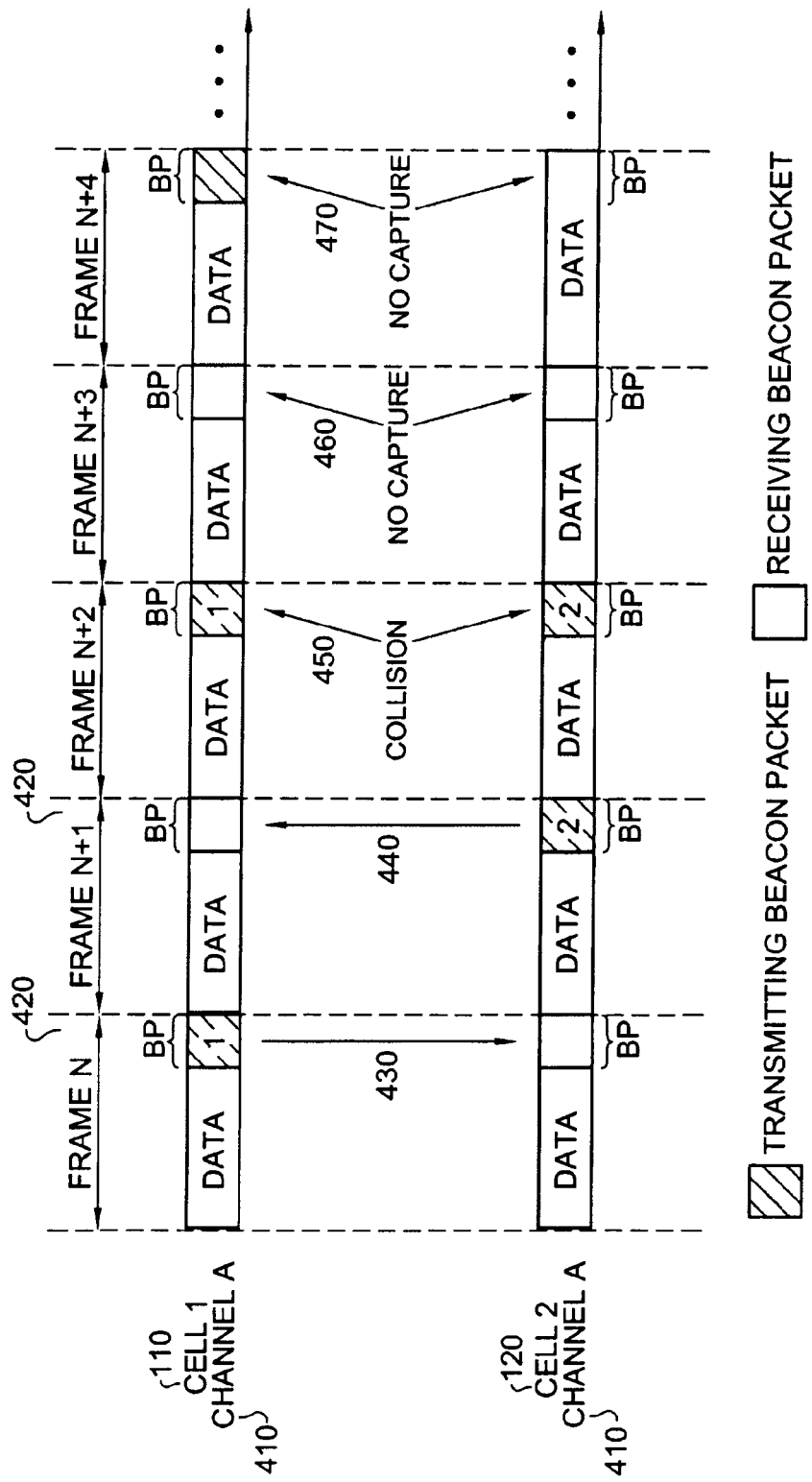
FIG. 4 is a depiction of an example of CBP inter-cell communication as known in the prior art in which two cells are operating on the same channel.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A cognitive radio inter-network Beacon Period Framing ("BPF") communications protocol provides reliable, efficient and scalable inter-network communications for supporting inter-network coordination functionality. Embodiments of the present invention schedule BPs into announcement, reservation, free-to-use, and joining scenarios to provide an efficient and reliable use of BPs within a communication/data super-frame. Inter-network communication and coordination efficiency and reliability is increased via BPF by eliminating collisions and bandwidth wastage.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The BPF Protocol adopts the super-frame and frame structure proposed in IEEE 802.22. Each channel within the network is partitioned in time into synchronized super-frames, each of which consists of 16 data frames with a fixed frame size. Each fixed size frame is further divided into a data transmission period and an optional fixed size BP. The BP, which operates independent of the data transmission period, allows coexisting WRAN cells to exchange coexistence beacons for inter-network communications. In line with 802.22, each BP allows one beacon to be transmitted, and a network cell is only allowed to transmit coexistence beacons in BPs on its operating channel.

Figure 5:
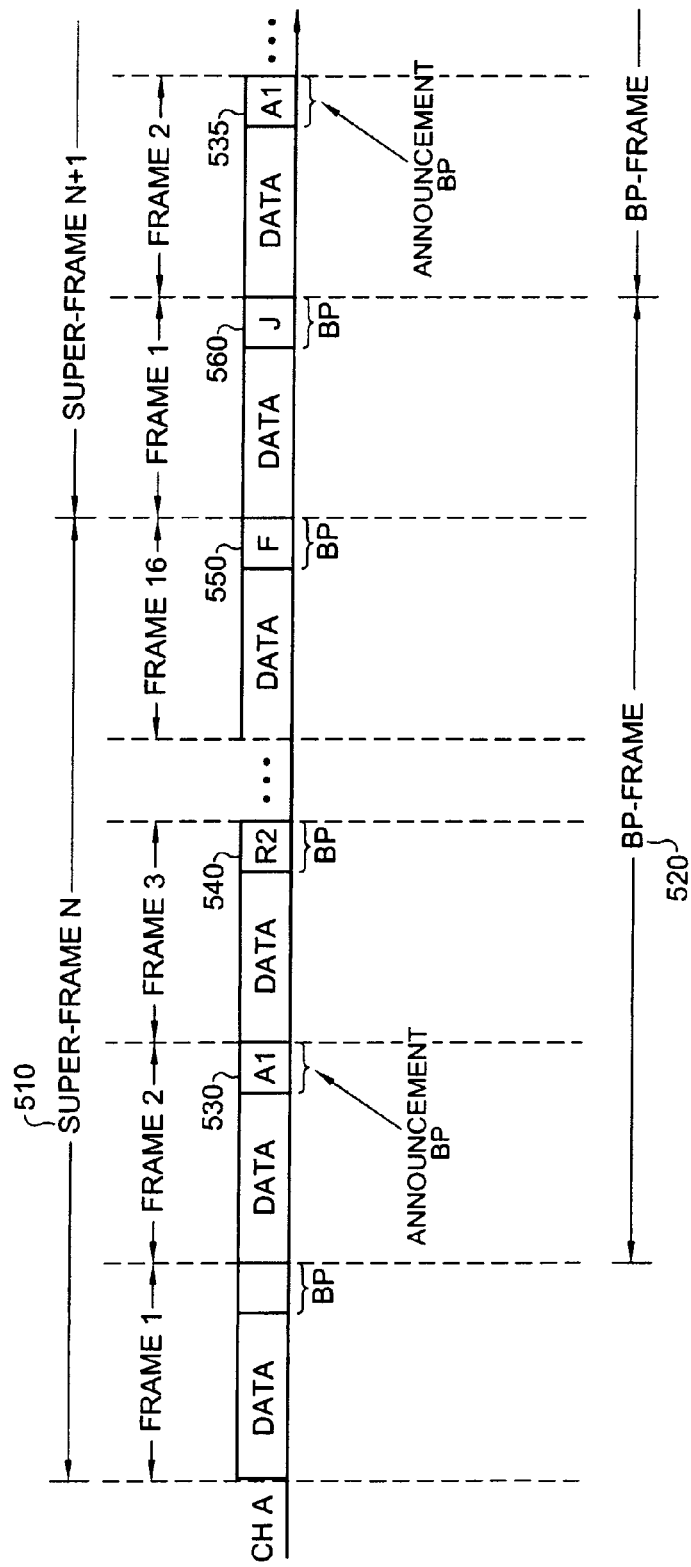
FIG. 5 is a depiction of beacon period framing as used in inter-cell communication according to one embodiment of the present invention.

As shown in FIG. 5, a BP Frame is a group of 16 BPs in consecutive data frames. The BP frame begins with an Announcement BP ("A-BP") 530 and ends with a BP preceding the A-BP of the next BP Frame. The location of the A-BP is designed to be unique across a large number of continuous channels. To achieve such uniqueness, one embodiment of the present invention specifies that an A-BP for a particular channel always resides in a MAC frame with the frame index (within a super-frame) equal to the channel number of the residual channel modulo 16. Recall that for two integers A and N we denote A mod N as the remainder of A divided by N. We call the number A mod N the residual of A with respect to (or modulo) N.

Thus in the example shown in FIG. 5, the second frame of the super-frame is equal to the channel number of the residual channel modulo 16.

According to another embodiment of the present invention, the BP Frame 520 consists of a MAP (the payloads' scheduling information) and the payloads. (The payloads being the 16 BPs in the BP Frame.) The MAP of a BP Frame is carried by the announcement beacon transmitted in the A-BP. As an example, FIG. 5 shows a BP Frame for a coexistence scenario where cell 1 and cell 2 reside on channel A. The A-BP, which is reserved by cell 1 and labeled as "A1" 530, is the first BP in the BP Frame. As specified in the MAP, the second BP is reserved for cell 2 labeled as "R2" 540. The other unassigned BPs are set to be Free-to-Use labeled as "F" 530. Finally the last BP is reserved for Joining, "J" 560, such as allowing a new cell to participate in the network The A-BP 530 is generally at the beginning of a BP Frame and is reserved by a network cell for the transmission of the announcement beacon. The announcement beacon can include, for example, broadcasting to one-hop cells within the network the channel or spectrum on which it is operating.

A reservation BP 540 is reserved for use by a particular network cell, say cell x, that resides on the operating channel to perform contention-free beacon transmission. For example a cell operating on the network may desire to seek use of a shared spectrum. Other network cells that intend to receive a beacon packet from cell x can tune to the operating channel of cell x during x's R-BP by referring to the MAP. In that manner there is no wasted time waiting for a transmission.

One of the key considerations to effectively address the above design challenges for inter-cell communications is to eliminate non-deterministic characteristics of beacon transmissions. With this objective in mind and according to one embodiment of the present invention, each co-existing network cell can acquire on the operating channel a sequence of R-BPs that is not occupied by any other co-channel network cell. The acquired BPs provide the cell a reservation during which only it can talk on the network. The reserved BPs for a network cell are allocated periodically (such as one BP in every 8 MAC frames) in deterministic instances. Consequently, all network cells operating on the same channel will make their acquisition of Reserved BPs within the duration of one reservation period (e.g. 8 frames). The BP reservation pattern can then be repeated periodically.

Since every co-channel network cell reserves its own sequence of deterministic BPs for exclusive beacon transmissions, beacon packet collisions are eliminated as long as the reserved BPs do not overlap. Furthermore, the BP reservation pattern is repeated and can be detected by all network cells. Therefore, the transmission instances of beacon packets from each individual network cell are known to all other cells, and bandwidth efficiency can be improved by properly allocating BPs for beacon reception such that the "no capture" effect and collisions are avoided.

According to another embodiment of the present invention, a network cell can discover and communicate with a neighbor cell that reserves the same BP but resides on a different channel (also referred to herein as "co-reserving cells"). Assuming simultaneous transmitting and receiving of beacon packets is not allowed, a network cell, instead of transmitting, would temporarily tune to another channel during its reserved BP to capture any beacon packet transmitted by a neighbor cell that could have reserved the same BP. It may take at least one reservation period to perform such discovery for each out-of-band channel, considering the possibility that two co-reserving cells across channels may try to discover each other at the same time, in which case both will fail.

It is also possible that multiple co-channel network cells could attempt to make reservations on the same BP, in which case collisions will occur. According to one embodiment of the present invention, once a collision has been detected, each of the colliding network cells will defer the reservation process for a random number of BPs before re-attempting to make another reservation.

As with previous systems, a discovering network cell still needs to monitor at least one BP reservation period (e.g. a duration of 8 MAC frames) in order to discover all network cells on a particular channel. And as a network cell may independently join and leave a channel, the reservation pattern that a cell obtained in the past may not be compatible with the current reservation pattern. Because of this, each network cell verifies the BP reservation of all WRAN cells on a particular channel before the inter-cell communication can proceed. The latency for such verification process can be at least one BP reservation period.

Another consideration with Beacon Period Reservation is its lack of flexibility and scalability. When a reservation period is selected to be large, the inter-cell communication latency will be correspondingly large. On the other hand, when a smaller reservation period is selected to reduce the communication latency, the system may not be able to accommodate a large number of network cells. For example, a reservation period of 4 frames constrains the inter-cell communication latency of 4 frames, however, it can only allow up to 4 co-channel cells to coexist. Therefore and according to another embodiment of the present invention, the reservation period is adjustable according to change in coexistence scenarios (such as the network topology and the number of coexisting cells).

A Free-to-use BP 550 can be used in many ways by all network cells residing on the operating channel: either for data transmissions, or for beacon transmissions (using contention based method) or receptions, or for any other system maintenance purposes. Finally the Joining BP 560 is used for an off-channel or new network cell to join the BP Frame so as to participate in communication on the operating channel.

According to one embodiment of the present invention, one network cell of a plurality of network cells operating on the same channel behaves as the channel coordinator and is responsible for transmitting an announcement beacon during the A-BP, managing channel membership (the joining of new members and the leavening of old members), and scheduling of BPs for all channel members by generating the MAP. By default, the network cell that occupies the channel first becomes the channel coordinator automatically. However, the duties of coordinator can be switched from network cell to network cell so that fairness and load balancing can be maintained. All the other co-channel network cells behave as the channel members.

When a cognitive radio network cell intends to operate on a channel in which there is ensured to be no incumbent present, the cell scans the channel in search of the Announcement Beacon in the channel's A-BP. When none is found, the now current occupier of the channel acquires the A-BP using a random access mechanism. The network cell then operates as the channel coordinator on the channel as previously described.

When an announcement beacon is found, the cell will try to join the channel communication using the J-BP scheduled in the MAP encoded in the announcement beacon. When the joining succeeds, the cell will be able to communicate with the neighboring cells using the reserved beacon periods allocated by the channel coordinator. When the joining process fails, the cell scans for another channel on which to operate. Furthermore, after joining a channel a network cell may decide to leave due to, for example, load balancing reason. When a cell leaves a channel, it sends the channel coordinator a leave notice. The channel coordinator updates the MAP accordingly after a leave notice is received.

The assignment of BPs and scheduling of network cells to communicate on BPs are flexibly managed by the channel coordinator. Note that the coexistence scenario could be dynamically changed over time due to, for example, channel switching or mobility of the network cells. BPF Protocol allows the scheduling of BPs to be adapted to the current coexistence scenario optimizing scalability, performance, and bandwidth efficiency for inter-network communications. For example, when the number of co-channel network cells is small, each cell can be allocated more R-BPs so that it can have more control to manage the inter-network communications. On the other hand, when the number of co-channel network cells increases, each cell is allocated less R-BPs so as to accommodate more channel members.

While the implementation of BPF can accommodate multiple cells operating on differing channels, the basic communication operations can be summarized as receiving beacon packets and transmitting beacon packets. These steps are summarized below.

1) For Cell A to Receive Beacon Packets from Cell B
  Tune to the operating channel of Cell B—Ch(B), during the A-BP of Ch(B);
  Receive and decode the BP Frame's MAP of Ch(B)
  Identify the R-BP of Cell B—R-BP(B);
  When R-BP(B) exists, receive beacon packets from Cell B at R-BP(B);
  Else, try to receive beacon packets from Cell B during the F-BP on Ch(B);

2) For Cell A to Transmit Beacon Packets to Cell B
  When a R-BP is required for the beacon transmission, reserve one—R-BP(A);
  Transmit the MAP of the BP frame of Ch(A) during the A-BP of Ch(A);
  When R-BP(A) is available, transmit the beacon packet during R-BP(A);
  Else, transmit the beacon packet during a F-BP on Ch(A).

Figure 6:
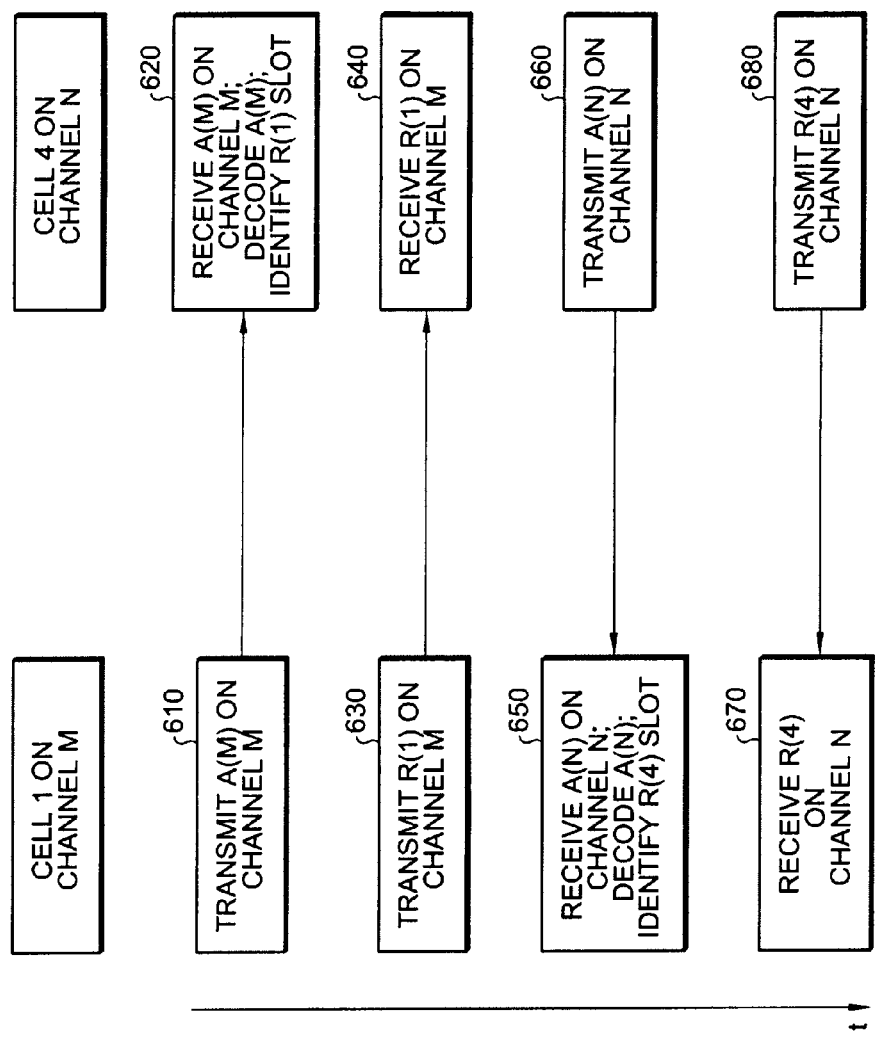
FIG. 6 is a flowchart of one method embodiment for On-Demand Spectrum Contention ("ODSC") message flow using MAC layer messaging according to the present invention.

FIG. 6, consistent with the steps outlined above, is a process flowchart illustrating methods of implementing an exemplary process for inter-cell communication. In the following description, it will be understood that each block of the flowchart illustration, and combinations of blocks in the flowchart illustration, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems that perform the specified functions or steps, or combinations of special purpose hardware and computer instructions.

Illustrated in FIG. 6 is an example of inter-cell communication between two cells in a cognitive radio network utilizing BPF according to the embodiments of the present invention. As shown Cell 1 is operating on Channel M while Cell 4 is operating on Channel N. As previously discussed the superframes associated with each cell are synchronized meaning that frame 1 of Channel M is aligned with frame 1 of Channel N.

Both Cell 1 and Cell 4 have, according to the present invention, an announcement beacon period. Included with the beacon is the MAP of the beacon frame. Cell 1 therefore first transmits 610 its announcement message on channel M which is received 620 by Cell 2. Cell 2 decodes the announcement message which includes Cell 1's MAP identifying R(1) as a reserved slot during which Cell 1 will transmit.

Knowing that Cell 1 will transmit during R(1) 630 on Channel M, Cell 2 is poised to receive 640 the transmission. Similarly, Cell 2 transmits 660 its announcement beacon on Channel N which is received and decoded 650 by Cell 1 on channel M. Associated with the announcement is Cell 2's MAP that identifies a beacon period, R(4), during which Cell 1 can expect Cell 2 to transmit. With the MAP received and decoded by Cell 1, Cell 2 transmits on R(4) 680 which is received by 670 Cell 1.

The steps outlined above can be used to coordinate spectrum sharing and contention resolution. For example consider the scenario in which Cell 1, due to pending use by an incumbent transmitter, desires to utilize channel N. Assume that both Cell 1 and Cell 4 can not simultaneously use channel N. Thus a contention exists on which cell should occupy and use channel N. As disclosed in a related patent application entitled, "On-demand Spectrum Contention for Inter-cell Spectrum Sharing in Cognitive Radio Networks," a contention resolution protocol can resolve the situation efficiently and fairly using MAC layer communications such as the beacon periods described in the present invention. In that invention, the process to resolve such channel utilization contentions uses independent communication between cells.

For example, Cell 4, having provided an announcement that it is transmitting on Channel N and aware that Cell 1 will be transmitting on R(1) and is a cell within one-hop of Cell 4, can set its request window for accepting requests to compete for channel occupancy to ensure it includes R(1). Using the reserved BPF of the present invention, the contention resolution process can proceed efficiently and reliably. Furthermore, the present invention is equally scalable as is the ODSC protocol; thus as more cells vie for use of the same shared spectrum, BPF can ensure that the communication between cells takes place efficiently and reliably.

While there have been described above the principles of the present invention in conjunction with shared spectrum contention resolution, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A protocol for inter-cell communication in a cognitive radio wireless access network ("WAN"), said protocol comprising:
    identifying for each channel number associated with the cognitive radio WAN a super-frame, each super-frame having a plurality of frame periods and wherein each frame period includes a data transmission period and a beacon period; and
    designating an announcement beacon period for each channel number operating within the cognitive radio WAN, wherein
    the announcement beacon period is a first beacon period of a BP-frame, said BP-frame comprising a plurality of beacon periods, and wherein
    the BP-frame comprises frames periods of the super-frame with an offset.

2. The protocol of claim 1 wherein the announcement beacon period is associated with a frame index within the super-frame equal to a residual of the channel number modulo 16.

3. The protocol of claim 1 wherein the beacon period of each frame period is within a medium access control frame independent of the data transmission period.

4. The protocol of claim 1 wherein said BP-frame comprising 16 beacon periods.

5. The protocol of claim 4 wherein the announcement beacon period includes payload scheduling information for each beacon period within the BP-frame.

6. The protocol of claim 4 wherein for each channel number each frame subsequent to the announcement frame in the BP-frame can be reserved by a cell operating within the cognitive radio WAN.

7. The protocol of claim 6 wherein a last beacon period in the BP-frame is reserved for a new cell to join the cognitive radio WAN.

8. The protocol of claim 7 wherein frames neither reserved or identified as announcement beacon periods are available for use by all cells within the cognitive radio WAN.

9. The protocol of claim 7 wherein cells operating on the same channel number acquire reserved BP-frames during a reservation period.

10. The protocol of claim 9 wherein the reservation period is periodically repeated.

11. A non-transitory computer-readable storage medium tangibly embodying a program of instructions executable by a machine wherein said program of instructions comprises a plurality of program codes for inter-cell communication in a cognitive radio wireless access network ("WAN"), said program of instruction comprising:
    program code for identifying for each channel number associated with the cognitive radio WAN a super-frame, each super-frame having a plurality of frame periods and wherein each frame period includes a data transmission period and a beacon period; and
    program code for designating an announcement beacon period unique for each channel number operating within the cognitive radio WAN, wherein
    the announcement beacon period is a first beacon period of a BP-frame, said BP-frame comprising a plurality of beacon periods, and wherein the BP-frame comprises frames periods of the super-frame with an offset.

12. The computer-readable storage medium of claim 11 wherein the announcement beacon period is associated with a frame index within the super-frame equal to a residual of the channel number modulo 16.

13. The computer-readable storage medium of claim 11 wherein the beacon period of each frame period is within a medium access control frame.

14. The computer-readable storage medium of claim 11 wherein said BP-frame comprising 16 beacon periods.

15. The computer-readable storage medium of claim 14 wherein the announcement beacon period includes payload scheduling information for each beacon period within the BP-frame.

16. The computer-readable storage medium of claim 14 wherein for each channel number each frame subsequent to the announcement beacon frame in the BP-frame can be reserved by a cell operating within the cognitive radio WAN.

17. The computer-readable storage medium of claim 16 wherein frames neither reserved or identified as announcement beacon periods are available for use by all cells within the cognitive radio WAN.

18. The computer-readable storage medium of claim 17 wherein cells operating on the same channel number acquire reserved BP-frames during a reservation period.

19. The computer-readable storage medium of claim 17 wherein the reservation period is periodically repeated.

* * * * *